US012092010B2

United States Patent
Lee et al.

(10) Patent No.: US 12,092,010 B2
(45) Date of Patent: Sep. 17, 2024

(54) SYSTEM FOR REDUCING VOC AND NITROGEN OXIDE AND METHOD FOR REDUCING SAME

(71) Applicant: KOREA RESEARCH INSTITUTE OF CHEMICAL TECHNOLOGY, Daejeon (KR)

(72) Inventors: Jin Hee Lee, Daejeon (KR); Iljeong Heo, Daejeon (KR); Tae Sun Chang, Daejeon (KR); Ji Hoon Park, Daejeon (KR); Sang Joon Kim, Daejeon (KR); Young Jin Kim, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 0 days.

(21) Appl. No.: 18/232,290

(22) Filed: Aug. 9, 2023

(65) Prior Publication Data

US 2023/0383680 A1 Nov. 30, 2023

Related U.S. Application Data

(62) Division of application No. 17/432,063, filed as application No. PCT/KR2020/002441 on Feb. 20, 2020.

(30) Foreign Application Priority Data

Feb. 20, 2019 (KR) .......... 10-2019-0019694
Feb. 21, 2019 (KR) .......... 10-2019-0020244

(51) Int. Cl.
*F01N 3/20* (2006.01)
*B01D 53/04* (2006.01)
(Continued)

(52) U.S. Cl.
CPC ......... *F01N 3/202* (2013.01); *B01D 53/0438* (2013.01); *B01D 53/30* (2013.01);
(Continued)

(58) Field of Classification Search
CPC .......... B01D 53/9481; B01D 2257/708; F01N 3/028; F01N 3/202
See application file for complete search history.

(56) References Cited

U.S. PATENT DOCUMENTS 9,597,627 B2    3/2017 Zhang
2012/0137660 A1  6/2012 Yan et al.
(Continued)

FOREIGN PATENT DOCUMENTS

CN       204478340 U       7/2015
DE  10 2015 212 040 A1    12/2016
(Continued)

OTHER PUBLICATIONS

International Search Report of PCT/KR2020/002441, Jun. 8, 2020, 6 pages.
(Continued)

*Primary Examiner* — Jonathan R Matthias
(74) *Attorney, Agent, or Firm* — Lewis Roca Rothgerber Christie LLP

(57) ABSTRACT

The present invention relates to a VOC reduction system and a VOC reduction method that applies pulse type thermal energy to a catalyst to activate the catalyst and oxidizes and removes the VOC.

10 Claims, 7 Drawing Sheets

(51) Int. Cl.
*B01D 53/30* (2006.01)
*B01D 53/94* (2006.01)
*F01N 3/28* (2006.01)

(52) U.S. Cl.
CPC ..... *B01D 53/9431* (2013.01); *B01D 53/9481* (2013.01); *B01D 53/9495* (2013.01); *F01N 3/208* (2013.01); *F01N 3/2803* (2013.01); *B01D 2253/108* (2013.01); *B01D 2257/708* (2013.01); *F01N 2370/04* (2013.01); *F01N 2900/1402* (2013.01)

(56) References Cited

U.S. PATENT DOCUMENTS

| | | |
|---|---|---|
| 2015/0033942 A1 | 2/2015 | Zhang |
| 2016/0363022 A1* | 12/2016 | Hoki .................. F01N 3/02 |

FOREIGN PATENT DOCUMENTS

| | | |
|---|---|---|
| JP | 2004-28952 A | 1/2004 |
| JP | 2009-197640 A | 9/2009 |
| JP | 2016-117055 A | 6/2016 |
| KR | 10-0324035 B1 | 2/2002 |
| KR | 10-1414039 B1 | 7/2014 |
| KR | 10-2015-0002907 A | 1/2015 |
| KR | 10-1836260 B1 | 3/2018 |

OTHER PUBLICATIONS

Office Action for U.S. Appl. No. 17/432,063, dated Sep. 13, 2023, 109 pages.

\* cited by examiner

[FIG. 1]
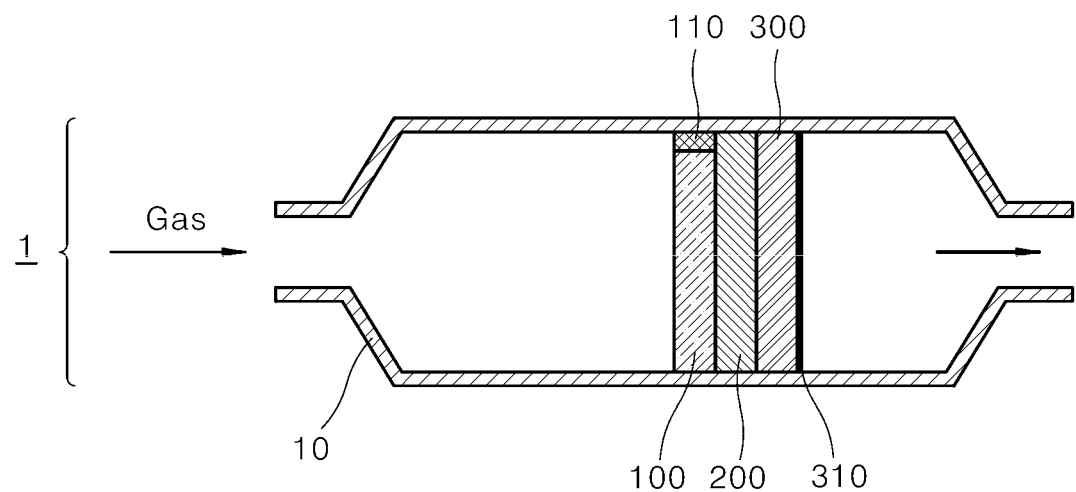

[FIG. 2]
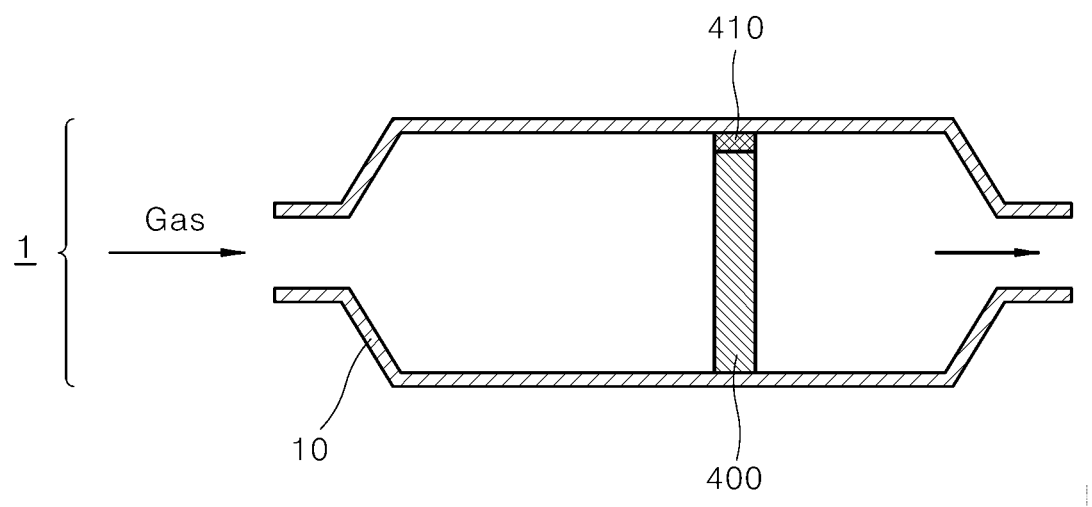

[FIG. 3]
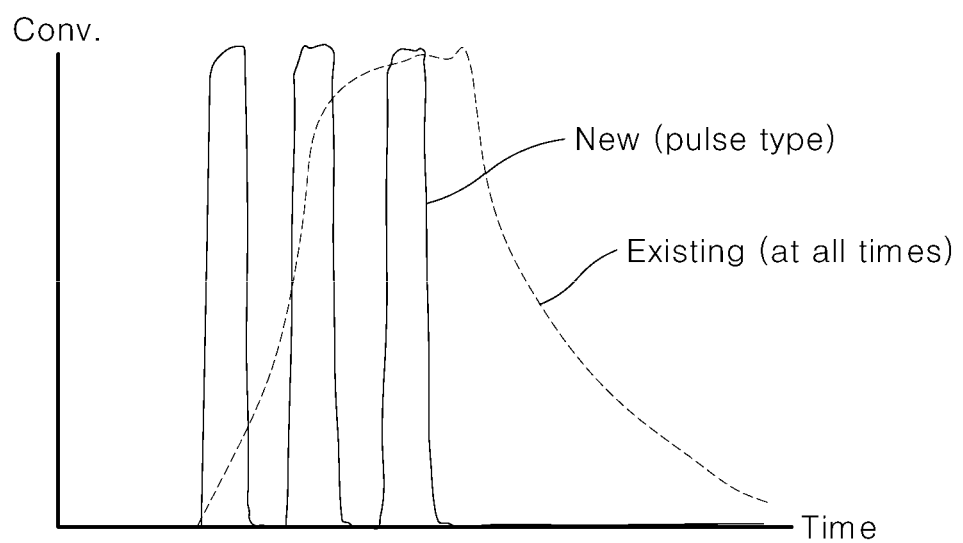

[FIG. 4]
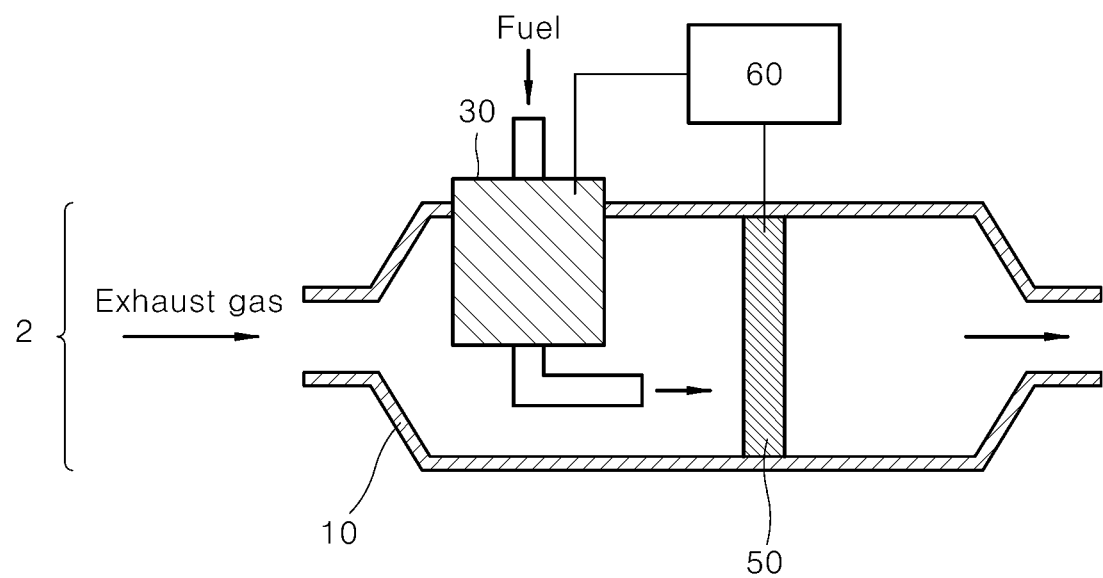

[FIG. 5]
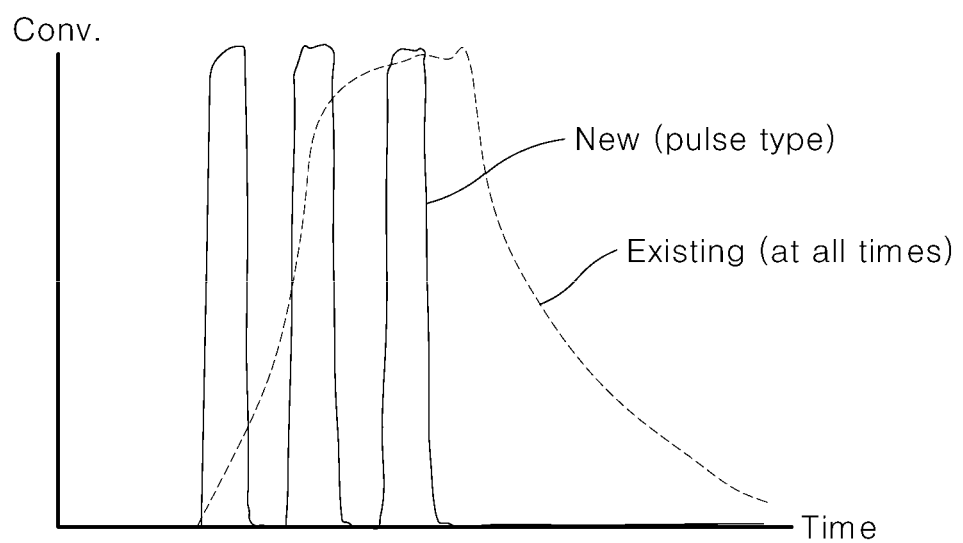

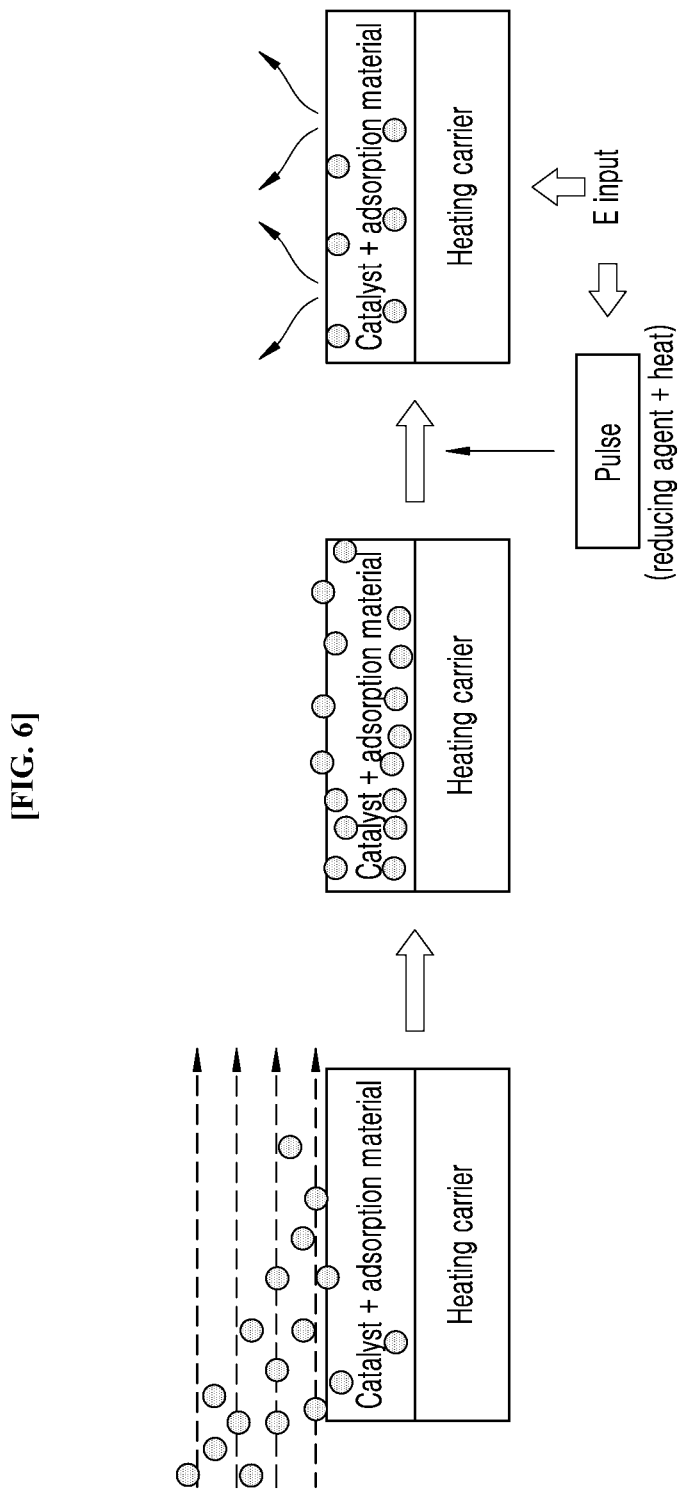
[FIG. 6]

[FIG. 7]
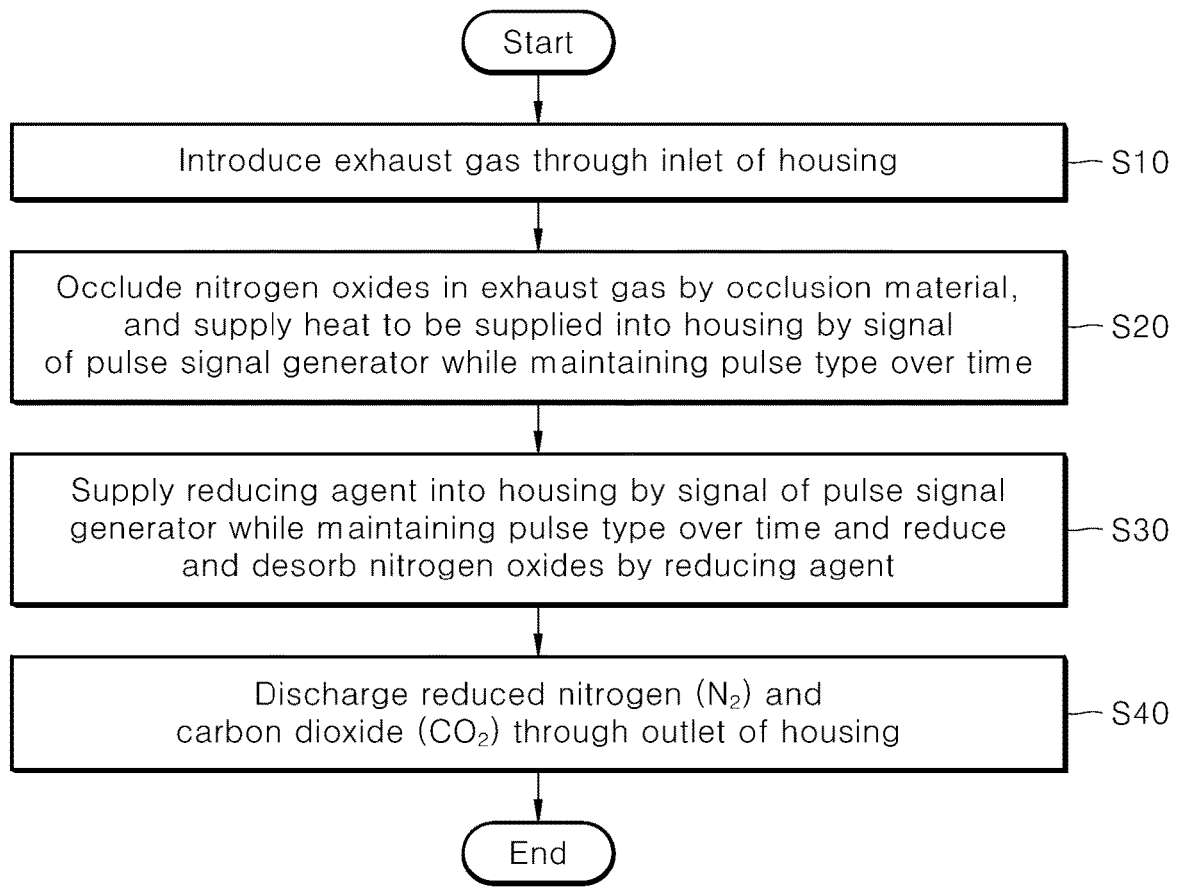

SYSTEM FOR REDUCING VOC AND NITROGEN OXIDE AND METHOD FOR REDUCING SAME

CROSS-REFERENCE TO RELATED APPLICATIONS

This application is a divisional of U.S. patent application Ser. No. 17/432,063, filed Aug. 8, 2021, which is a U.S. National Phase Patent Application of International Application Number PCT/KR2020/002441, filed on Feb. 20, 2020, which claims priority of Korean Patent Application Number 10-2019-0019694, filed on Feb. 20, 2019 and Korean Patent Application Number 10-2019-0020244, filed on Feb. 21, 2019, the entire content of each of which is incorporated herein by reference.

TECHNICAL FIELD

The present invention relates to a system for reducing volatile organic compounds (VOC) and nitrogen oxides (NOx) and a method for reducing the same.

Further, the present invention relates to a VOC reduction system and a VOC reduction method, and more particularly, to a VOC reduction system and a VOC reduction system that applies pulse type thermal energy to a catalyst to activate the catalyst and oxidizes and removes the VOC.

Further, the present invention relates to a pulse control system for reducing nitrogen oxide, a method of reducing nitrogen oxide using the same, and an internal combustion engine including the same, and more particularly, to a pulse control system for reducing nitrogen oxide, a method of reducing nitrogen oxide using the same, and an internal combustion engine including the same capable of saving energy and costs and being applicable to all internal combustion engine-based power sources, including overage cars and ships which cannot be equipped with existing post-processing devices.

BACKGROUND ART

Nitrogen oxides (NOx) are mainly generated in a process of burning fuel or raw materials at a high temperature, in incinerators, combustors, power plants, automobiles, and ships. When these nitrogen oxides are emitted to the atmosphere, respiratory diseases to the human body are caused and the growth rate of the plant are reduced or defoliated. In addition, in the city, ozone generation and photochemical smog are caused.

Such nitrogen oxides are present in the form of NO, $NO_2$, $N_2O$, $N_2O_4$, etc., and the largest damage by nitrogen oxides is that the nitrogen oxides react with hydrocarbons in the presence of solar light to cause photochemical smog. In addition, the nitrogen oxides not only cause visual disorders and a greenhouse effect, but also are converted to nitric acid and nitrate to cause acid rain. Accordingly, efforts for reducing nitrogen oxides are urgently requested. In particular, the nitrogen oxides cause a secondary fine dust problem by a fine dust precursor which is particulated in gas or air during discharging.

In Korea, nitrogen oxides having the highest emissions among air pollutants are mostly reduced by urea SCR. However, since such urea SCR requires expensive hardware and requires a lot of space due to additional devices for driving, there is a problem that it is limited to be distributed to various emission sources.

A car is one of these emission sources of nitrogen oxides, and the recent maximum interest in the automotive industry is to provide high cost and eco-friendly vehicles. The harmful exhaust gas components generated in the car include not only nitrogen oxides, but also carbon monoxide (CO), hydrocarbon (HC), etc.

Currently, the emission of exhaust gas of domestic diesel cars is regulated by Euro 6 of the European Union, and will be regulated by reinforced Euro 7 in the future. In order to respond to such Euro 6, the world's automotive companies have mounted various devices capable of solving the exhaust gas in the cars.

In the case of a gasoline vehicle, since the amount of nitrogen oxides is very small compared to other hazardous substances, carbon monoxide (CO), hydrocarbon (HC), and nitrogen oxide, which are a three way catalyst device used since the 1970s, are oxidized-reduced to each other to treat the nitrogen oxides.

However, unlike this, since a diesel engine operating in oxygen excess conditions hardly removes nitrogen oxides, a lean NOx Traps (LNT) device, a selective catalyst reduction (SCR) device, or the like needs to be additionally mounted.

A selective catalyst reduction technique is configured to reduce nitrogen oxides to nitrogen and water vapor by mounting a catalyst layer on an exhaust gas channel, injecting a separate reducing agent to be supplied from the outside, and selectively reacting the nitrogen oxides with the reducing agent by a catalytic action.

As the reducing agent, ammonia ($NH_3$), urea, hydrocarbon, carbon monoxide, hydrogen, and the like are used, and optionally, ammonia reducing most nitrogen oxides is mainly used. However, recently, due to the restrictions on transportation, urea providing ammonia is used instead of ammonia, and in order to maintain removal performance of nitrogen oxides, a urea solution is injected by a dosing module disposed at a front end. When the injected urea solution is pyrolyzed by heat of the exhaust gas and hydrolyzed when meeting the catalyst, the generated ammonia is occluded and nitrogen oxides react with the occluded ammonia to be purified.

However, in order to supply liquid urea to the catalyst, it is necessary to have a separate device, and it is also necessary to have an additional device such as a container and a spraying device for storing urea in the liquid state, and as a result, the space utilization is deteriorated. Therefore, the SCR technique using urea may be mainly used for large vehicles and cargo vehicles, and has a disadvantage that it is difficult to be applied to small cars, old cars and coastal small-sized ships. In recent years, in the case of new lightweight custom vehicles, the urea SCR technique using a zeolite catalyst is used by securing an additional space, but as a result, the price rise of the vehicle is accompanied. In addition, since a urea solution as a reducing agent needs to be periodically supplemented, there is a problem that the economic burden is large and the process is cumbersome.

LNT is a technique in which an NOx occlusion material and a diesel oxidation catalyst (DOC) are configured in one carrier, and in lean-mode driving, NOx is occluded in an occlusion material such as barium (Ba), rich-mode driving is temporarily induced similarly to a three way catalyst, and carbon monoxide, hydrocarbon, etc. of the exhaust gas are generated to reduce and purify the occluded NOx to nitrogen and water by using the generated carbon monoxide, hydrocarbon, etc as the reducing agent.

Since a conventional diesel engine drives in a lean mode having a low air to fuel ratio, in order to reduce nitrogen oxides occluded in the LNT, it is necessary to artificially make fuel be a rich atmosphere. Accordingly, since excess fuel is used in the process of making the fuel be the rich atmosphere, reduction of fuel efficiency is inevitable, there are problem in that the catalyst temperature at a low temperature is maintained at 250° C. or less, NOx reduction reaction is not activated, and a large amount of NOx is discharged at the rich atmosphere.

Further, after a trace amount of sulfur component of the fuel is converted to SOx in engine exhaust gas, the SOx reacts with alkali metal oxides such as barium oxide and the like required for NOx occlusion to be converted to barium sulfate ($BaSO_4$) and the like, and as a result, there is also a problem that a barium activation point gradually becomes in a saturated state by sulfur and the activity of the nitrogen oxides is lost.

Meanwhile, the volatile organic compounds (VOC) is an organic compound which has a high vapor pressure and a low melting point, is easily evaporated even at room temperature to be diffused in the air, and most of VOC has a pungent smell and is harmful to the human body.

Types of VOC include organic solvents used in chemical processes, carbon chloride used as a spray or a refrigerant, gasoline or compounds derived therefrom, compounds of benzenes contained in exhaust gas of cigarettes or automobiles, formaldehyde, a raw material such as building materials, paints, and adhesives, etc.

Generally, the VOC may be classified into a hypervolatile organic compound having a boiling point of 0 to 100° C., a volatile organic compound having a boiling point of 100 to 260° C., and a semi-volatile compound having a boiling point of 260 to 400° C. As direct harmfulness to volatile organic compounds (VOC), in the case of benzene, it was known to cause leukemia, central nervous disorders and chromosome abnormality. As indirect secondary harmfulness, ozone ($O_3$), which is a cause of photochemical smog, is generated through photochemical reactions with nitrogen oxides (NOx) and other chemicals present in the atmosphere, or there are causes of photochemical smog, destruction of the ozone layer of the stratosphere, and global warming, etc. and there is a fatal bad effect to environment and human body by strong acidic secondary contaminants such as peroxy-acetylnitrate (PAN).

Accordingly, in each country, regulations on the discharge of volatile organic compounds (VOC) have been reinforced, and a regulatory means for discharge of volatile organic compounds (VOC) is diverse in regulation items in foreign countries. In the clean air act (CAA), the US air pollution emission regulations related art, 189 hazardous substances (70% or more of the substances is VOC) are required to reduce the current emission to about 90%. In Europe, in the VOC air pollution prevention measures, each member country aims to reduce VOC of 30% or higher as compared with the basic year determined by each country in 1999. In Korea, until 2018, reduction of VOC emission of 50% or more is targeted, and regulations have bee reinforced on oil storage facilities, gas stations, painting facilities, printing facilities, and laundry facilities, which have been excluded from the emission facility regulation object until now.

On the other hand, as part of efforts to remove volatile organic compounds (VOC), currently, a technique of removing VOC which is widely employed worldwide and commercialized includes a direct combustion method, an adsorption method, a catalyst oxidation method, etc.

Among the VOC removal techniques, the direct combustion method (hot incineration) constituted together with thermal energy recovery equipment is a method of degrading emission gas through exhaustion and has been used widely as compared with other techniques, and has an advantage capable of removing the VOC up to 95% to 99%. However, in the case of driving while the VOC concentration is low, there are disadvantages that since the fuel needs to be supplied from the outside as a heat source, there are a lot of driving costs, and when a halogen compound is included or a large amount of inorganic metal compound is contained in the exhaust gas, additional incineration equipment is required, and there is a possibility to generate NOx at high temperatures.

The adsorption method is a method of collecting, capturing, and leaving pollutants on the surface of the adsorbent by contacting gas with a solid adsorbent and has advantages of being easy to operate, having low operating costs or equipment investment, using even when the concentration of contaminants in exhaust gas is extremely low or the contaminants are non-flammable, and almost completely removing compounds with low volatility and large molecular weights. On the other hand, there are disadvantages of being difficult to desorb the compound during regeneration of the adsorbent, causing secondary contamination, and requiring a pre-treatment process such as filtration, cooling, and moisture removal because a material with high volatility and a molecular weight of 45 or less is not easily adsorbed in the adsorbent and the adsorbent is sensitive to the state of the discharge gas.

On the other hand, the catalytic oxidation method has advantages of being suitable for operating in the treatment of waste gas containing a low concentration of volatile organic compounds (VOC), and conditions of changing the flow rate and concentration, having low energy consumption and low investment cost and operating cost as compared with other systems, operating at a low temperature, and exhibiting relatively high efficiency, which is a field of recently attracting the most attention.

DISCLOSURE

Technical Problem

An object of the present invention is to provide a system for reducing volatile organic compounds (VOC) and nitrogen oxides (NOx) and a method for reducing the same.

Further, in order to solve the problems, there is provided a VOC reduction system capable of desorbing and removing volatile organic compounds (VOC) adsorbed in an adsorbent by supplying pulse type thermal energy, instead of a direct combustion type.

Further, an object of the present invention is to provide a pulse control system for reducing nitrogen oxides capable of reducing energy and costs and reducing nitrogen oxides even in a lean mode.

Further, an object of the present invention is to provide a pulse control system for reducing nitrogen oxides capable of being applied to old cars, ships and all other internal combustion engine power systems in which a mounting space of existing reduction devices is not secured due to high space utilization.

The objects to be solved by the present disclosure are not limited to the aforementioned object(s), and other object(s), which are not mentioned above, will be apparent to those skilled in the art from the following description.

Technical Solution

The present invention provides a system for reducing volatile organic compounds (VOC) and nitrogen oxides.

According to a preferred embodiment of the present invention, a VOC reduction system includes: a housing having an inlet and an outlet formed such that gas is introduced and discharged therethrough; an adsorption/desorption module disposed in the housing to adsorb/desorb volatile organic compounds (VOC) included in the gas; a VOC front-end sensing unit disposed on one side of the adsorption/desorption module to sense the concentration of VOC adsorbed by the adsorption/desorption module; a catalyst disposed on the other side of the adsorption/desorption module to oxidize VOC desorbed by the adsorption/desorption module; a heating carrier disposed on one side of the catalyst to supply thermal energy to the catalyst; and a VOC rear-end sensing unit disposed behind the heating carrier to sense the concentration of VOC converted by the catalyst.

In one embodiment, the heating carrier may further include a heating means supplying pulse type thermal energy, and the heating means may be associated with the VOC front-end sensing unit, and may apply the pulse type thermal energy to the heating carrier when the VOC concentration sensed by the VOC front-end sensing unit is sensed as the predetermined value or higher.

In one embodiment, the adsorption/desorption module may include zeolite as an adsorbent.

In one embodiment, the catalyst may be formed by introducing at least one selected from the group consisting of Pt, Pd, Rh, Cu, Cr, Mn, Fe, Ni, Co, V, Zn, and oxides thereof to a carrier, and the carrier may have a bulk form compressed by a presser.

In one embodiment, the catalyst may be a monolith catalyst by introducing at least one selected from the group consisting of Pt, Pd, Rh, Cu, Cr, Mn, Fe, Ni, Co, V, Zn, and oxides thereof to a carrier and coating the material on a honeycomb substrate.

In one embodiment, the carrier may be at least one selected from the group consisting of $Al_2O_3$, $SiO_2$, and $TiO_2$.

According to another preferred embodiment of the present invention, a VOC reduction system includes: a housing having an inlet and an outlet formed such that gas is introduced and discharged therethrough; and a composite module which is disposed in the housing and includes an adsorbent layer capable of adsorbing and concentrating VOC included in the gas, a heating carrier having a heating means heating the VOC adsorbed in the adsorbent layer to be desorbed, and a catalyst layer removing the VOC when the VOC is desorbed from the adsorbent, wherein the composite module desorbs the VOC and activates the catalyst layer when the concentration of VOC adsorbed in the adsorbent layer is a predetermined value or higher, to remove the VOC.

In one embodiment, the heating carrier having the heating means may apply the pulse type thermal energy to the catalyst layer.

According to yet another preferred embodiment of the present invention, a VOC reduction method is characterized in that an adsorption/desorption module adsorbs volatile organic compounds (VOC) in gas, activates a catalyst by applying pulse type thermal energy to a heating carrier when a VOC concentration value of the adsorption/desorption module adsorbed with the VOC is a predetermined value or higher, desorbs the VOC from the adsorption/desorption module adsorbed with the VOC, and then removes the VOC by the activated catalyst.

In one embodiment, the pulse type thermal energy may be applied to the heating carrier.

In one embodiment, the adsorption/desorption module may desorb the VOC when the concentration of the adsorbed VOC is a predetermined value or higher.

A pulse control system for reducing nitrogen oxides according to the present invention includes: a housing having an inlet and an outlet formed such that an exhaust gas is introduced and discharged therethrough; a composite catalyst carrier and a heat supplier disposed between the inlet and the outlet, the composite catalyst carrier carrying an occlusion material for occluding nitrogen oxides (NOx) inside the exhaust gas that has passed through the inlet, and an oxidation/reduction catalyst; a reducing agent supply unit for storing a reducing agent for reducing nitrogen oxides occluded by the occlusion material; and a pulse signal generator connected to each of the composite catalyst carrier, the heat supplier, and the reducing agent supplier so as to generate pulse signals such that the concentrations of the reducing agent and heat supplied into the housing maintain pulse types over time.

The occlusion material may be any one selected from the group consisting of alkali metals, alkaline earth metals, transition metals, rare earth metals, zeolite and combinations thereof.

The oxidation/reduction catalyst may be any one selected from the group consisting of noble metals, transition metals, and combinations thereof.

The occlusion material and the oxidation/reduction catalyst may be carried on the surface of the carrier, or included as a component of the carrier.

The reducing agent may be any one selected from the group consisting of hydrogen ($H_2$), carbon monoxide (CO), hydrocarbon (HC), partially-oxidized hydrocarbon (OHC), carbon-nitrogen compounds, hydrogen-nitrogen compounds, ammonia ($NH_3$), and mixtures thereof.

Further, the present invention provides a method for reducing nitrogen oxides using a pulse control system including: (a) introducing exhaust gas through an inlet of a housing; (b) occluding nitrogen oxides in the exhaust gas by an occlusion material and supplying heat to be supplied into the housing by a signal of a pulse signal generator while maintaining a pulse type over time; (c) reducing and desorbing the nitrogen oxides by a reducing agent; and (d) discharging the reduced nitrogen ($N_2$) and carbon dioxide ($CO_2$) through an outlet of the housing.

Before the occlusion in step (b), nitrogen monoxide (NO) may be oxidized to nitrogen dioxide ($NO_2$) by an oxidation catalyst.

The occlusion material in step (b) may be any one selected from the group consisting of alkali metals, alkaline earth metals, transition metals, rare earth metals, zeolite and combinations thereof.

The reducing agent may be any one selected from the group consisting of hydrogen ($H_2$), carbon monoxide (CO), hydrocarbon (HC), partially-oxidized hydrocarbon (OHC), carbon-nitrogen compounds, hydrogen-nitrogen compounds, ammonia ($NH_3$), and mixtures thereof.

The concentration of the reducing agent may maintain a pulse type over time by a signal of the pulse signal generator.

Further, the present invention provides an internal combustion engine including the pulse control system for controlling supply of a reducing agent and heat.

Advantageous Effects

By using the VOC reduction system according to the present invention, since the volatile organic compounds (VOC) adsorbed in the adsorbent is desorbed by applying the pulse type thermal energy and the catalyst is activated to remove the VOC, there is an advantage capable of saving more energy than a conventional system of supplying energy continuously to activate the catalyst.

When the VOC adsorbed at room temperature reaches a saturation state, the VOC is desorbed by pulse heating and the desorbed VOC is removed from the heated (activated) catalyst at the same time.

In addition, since the pulse type thermal energy is supplied, there is an advantage that the lifetime of the catalyst may be extended and since the thermal energy is supplied only if necessary without heating at all times, there is an advantage that the energy consumption is small.

According to the system for reducing nitrogen oxides of the present invention, it is possible to reduce nitrogen oxides even in a lean mode and reduce nitrogen oxides to be discharged at room temperature.

Further, according to the system for reducing nitrogen oxides of the present invention, it is possible to reduce energy and costs by supplying the heat and the reducing agent in pulse types.

Further, according to the system for reducing nitrogen oxides of the present invention, there is an advantage that since the space utilization is high, it is possible to be applied to old cars, ships, and all other internal combustion engine power systems.

It should be understood that the effects of the present invention are not limited to the effects, but include all effects that can be deduced from the detailed description of the present invention or configurations of the present invention described in appended claims.

DESCRIPTION OF DRAWINGS

FIG. 1 is a schematic diagram of a VOC reduction system according to an embodiment of the present invention.

FIG. 2 is a schematic diagram of a VOC reduction system according to another embodiment of the present invention.

FIG. 3 is a graph showing catalyst activities of the present invention and a conventional VOC removal system.

FIG. 4 is a schematic diagram of a pulse control system for reducing nitrogen oxides according to an embodiment of the present invention.

FIG. 5 is a graph showing nitrogen oxide conversion performance by time according to injection of heat and a reducing agent in a pulse control system for reducing nitrogen oxides according to an embodiment of the present invention and a conventional denitrification catalyst technology.

FIG. 6 is a diagram showing that a composite catalyst carrier and a heat supplier reduce nitrogen oxides according to an embodiment of the present invention.

FIG. 7 is a flowchart of a method for reducing nitrogen oxides by a pulse control system according to an embodiment of the present invention.

BEST MODE FOR THE INVENTION

A system for reducing VOC according to the present invention comprises: a housing having an inlet and an outlet formed such that gas is introduced and discharged therethrough; an adsorption/desorption module disposed in the housing to adsorb/desorb volatile organic compounds (VOC) included in the gas; a VOC front-end sensing unit disposed on one side of the adsorption/desorption module to sense the concentration of VOC adsorbed by the adsorption/desorption module; a catalyst disposed on the other side of the adsorption/desorption module to oxidize VOC desorbed by the adsorption/desorption module; a heating carrier disposed on one side of the catalyst to supply thermal energy to the catalyst; and a VOC rear-end sensing unit disposed behind the heating carrier to sense the concentration of VOC converted by the catalyst.

According to the present invention, fuel and a reducing agent are supplied so that the concentrations thereof maintain pulse types, thereby enabling reduction of nitrogen oxides even in a lean mode. In addition, the present invention provides a system for reducing nitrogen oxides capable of saving energy and costs and being applicable to old cars, ships, and all other kinds of internal combustion engine power systems.

A system for reducing nitrogen oxides according to the present invention comprises: a housing having an inlet and an outlet formed so that exhaust gas is introduced and discharged therethrough; a composite catalyst carrier and a heat supplier which are disposed between the inlet and the outlet and carry an occlusion material for occluding nitrogen oxides (NOx) inside the exhaust gas that has passed through the inlet and an oxidation/reduction catalyst; a reducing agent supply unit for storing a reducing agent for reducing the nitrogen oxides occluded by the occlusion material; and a pulse signal generator which is connected to each of the composite catalyst carrier, the heat supplier, and the reducing agent supply unit to generate pulse signals so that the concentrations of the heat and the reducing agent supplied into the housing maintain pulse types over time.

MODES FOR THE INVENTION

Advantages and features of the present disclosure, and methods for accomplishing the same will be more clearly understood from exemplary embodiments to be described below in detail with reference to the accompanying drawings. However, the present invention is not limited to the following exemplary embodiments but may be implemented in various different forms. The exemplary embodiments are provided only to complete disclosure of the present invention and to fully provide a person having ordinary skill in the art to which the present invention pertains with the category of the invention, and the present invention will be defined only by the appended claims.

The shapes, sizes, ratios, angles, numbers, and the like illustrated in the drawings for describing the exemplary embodiments of the present invention are merely examples, and the present invention is not limited thereto. Throughout this specification, like reference numerals denote like components.

Further, in describing the present invention, a detailed explanation of known related technologies may be omitted to avoid unnecessarily obscuring the subject matter of the present invention.

The terms such as "including," "having," and "consisting of" used herein are generally intended to allow other components to be added unless the terms are used with "only". When a component is expressed as singular form, any references to the singular form may include plural form unless expressly stated otherwise.

When the position relation between two parts is described using the terms such as "on", "above", "below", and "next", one or more other parts may be positioned between the two parts unless the terms are used with the term "immediately" or "directly".

In the case of a description of a time relation, for example, when a time order relation is described using the terms such as "after", "subsequent to", "next to", and "before", the case may include a case where the time order relation is not continuous unless the terms are used with the term "immediately" or "directly".

The features of various embodiments of the present invention can be partially or entirely coupled to or combined with each other and can be interlocked and operated in technically various ways, and the embodiments can be carried out independently of or in association with each other.

VOC Reduction System

Before the description of the present invention, volatile organic compounds (VOC), which can be processed by a VOC reduction system 1 according to the present invention, may consist of hydrocarbon components of acetaldehyde (C2H4O[CH3CHO]), acetylene (C2H2), acrolein (C3H4O), benzene (C6H6), 1,3-butadiene (C4H6), butane (C4H10), 1-butene (C4H8 [CH3CH2CHCH2]), 2-butene (C4H8[CH3(CH)2CH3]), cyclohexane (C6H12), ethylene (C2H4), formaldehyde (CH2O[HCHO]), n-hexane (C6H14), isopropyl alcohol (C3H8O[(CH3)CHOHCH3]), methanol (CH4O [CH3OH]), methyl ethyl ketone (C4H8O [CH3COCH2CH3]), methyl tertiary butyl ether (MTBE, C5H12O[CH3OC(CH3)2CH3]), propylene (C3H6), propylene oxide (C3H6O), acetic acid (C2H4O2), ethylbenzene (C8H10), toluene (C7H8), xylene (including o-, m-, p-) (C8H10), stylene (C8H8C8H8), etc.

An object of the present invention to solve the problems is to provide a VOC reduction system 1 capable of desorbing and removing volatile organic compounds (VOC) adsorbed in an adsorbent by supplying pulse type thermal energy, instead of a direction combustion type.

When using the VOC reduction system according to the present invention, since the VOC adsorbed in the adsorbent by supplying the pulse type thermal energy is desorbed and the removed by activating the catalyst, there is an advantage of saving more energy than a system of supplying energy continuously to activate the catalyst in the related art.

When the VOC adsorbed at room temperature reaches a saturation state, the VOC is desorbed by pulse heating, and the desorbed VOC is removed from the heated (activated) catalyst simultaneously.

In addition, since the pulse type thermal energy is supplied, there is an advantage that the lifetime of the catalyst may be extended and since the thermal energy is supplied only if necessary without heating at all times, there is an advantage that the energy consumption is small.

The VOC reduction system 1 according to the present invention has the largest constitutional feature by including a housing 10 having an inlet and an outlet formed so that gas is introduced and discharged therethrough; an adsorption/desorption module 100 which is disposed in the housing to adsorb/desorb volatile organic compounds (VOC) included in the gas; a VOC front-end sensing unit 110 disposed on one side of the adsorption/desorption module to sense the concentration of VOC adsorbed by the adsorption/desorption module; a catalyst 200 disposed on the other side of the adsorption/desorption module to oxidize VOC desorbed by the adsorption/desorption module; a heating carrier 300 disposed on one side of the catalyst to supply thermal energy to the catalyst; and a VOC rear-end sensing unit 310 disposed behind the heating carrier to sense the concentration of VOC converted by the catalyst.

An operation method of the VOC reduction system 1 according to an embodiment of the present invention will be briefly described as follows.

First, when the gas is introduced through the inlet while the power is turned on, the adsorption/desorption module 100 capable of adsorbing the VOC included in the gas continuously adsorbs the VOC in the exhaust gas to a predetermined concentration. At this time, the VOC front-end sensing unit 110 may sense the concentration of VOC adsorbed to the adsorption/desorption module 100.

The VOC front-end sensing unit 110 may sense the concentration of VOC adsorbed on the adsorption/desorption module 100 to desorb the VOC when the concentration of VOC is a predetermined value or more.

When the concentration of the VOC adsorbed by the adsorption/desorption module 100 is increased and highly concentrated, the VOC adsorbed by the adsorption/desorption module 100 may be desorbed from the adsorbed by the adsorption/desorption module 100 and simultaneously oxidized to $CO_2$ and $H_2O$ by the catalyst 200 disposed on one side of the VOC adsorption/desorption module 100.

The catalyst 200 may be activated by applying thermo-electric energy while the VOC is desorbed in the adsorption/desorption module 100. At this time, the VOC, which is oxidized (removed) by the catalyst 200, may be $CO_2$ and $H_2O$.

In addition, a VOC rear-end sensing unit 310 senses the concentration of remaining VOC in the gas once more and check the presence or absence thereof.

The adsorption of VOC is performed at 0° C. to 50° C., and when the VOC to be continuously supplied is adsorbed by the adsorption/desorption module 100 so that the VOC concentration is a predetermined value or higher, the adsorbed VOC is desorbed and simultaneously, the thermo-electric energy is supplied to activate the catalyst 200.

The activated catalyst 200 may oxidize the VOC.

At this time, the temperature condition when adsorbing the VOC to the adsorption/desorption module 100 may be 0° C. to 50° C. When the VOC is adsorbed to the adsorption/desorption module 100 to become a predetermined value or higher, the pulse type thermal energy is supplied and then the VOC may be desorbed. At the same time, the thermo-electric energy is applied to the catalyst 200 to increase the temperature of the catalyst 200, and the catalyst 200 may be activated by the increase of the temperature.

The catalyst 200 may be activated at 150° C. or higher to oxidize the VOC adsorbed by the adsorption/desorption module 100, specifically, to oxidize the VOC desorbed in a temperature condition of 150° C. to 400° C.

Meanwhile, the VOC oxidized by the catalyst 200 may be discharged by passing through the VOC rear-end sensing unit 310 of the housing 10.

The VOC rear-end sensing unit 310 may check the concentration of the VOC in the air to be discharged and the presence or absence of the VOC.

Hereinafter, the present invention will be described in detail.

FIG. 1 illustrates a schematic diagram of the VOC reduction system 1 according to the present invention.

As illustrated in FIG. 1, the VOC reduction system 1 according to an embodiment of the present invention includes a housing 10 having an inlet and an outlet formed so that gas is introduced and discharged therethrough; an adsorption/desorption module 100 disposed in the housing to adsorb/desorb volatile organic compounds (VOC) included in the gas; a VOC front-end sensing unit 110 disposed on one side of the adsorption/desorption module to sense the concentration of VOC adsorbed by the adsorption/desorption module; a catalyst 200 disposed on the other side of the adsorption/desorption module to oxidize the VOC desorbed by the adsorption/desorption module; a heating carrier 300 disposed on one side of the catalyst 200 to supply thermal energy to the catalyst 200; and a VOC rear-end sensing unit 310 disposed behind the heating carrier 300 to sense the concentration of VOC converted by the catalyst 200.

As long as the housing 10 is made of any material that can withstand hot heat, a type thereof is not limited.

The heating carrier 200 further includes a heating means (not illustrated) supplying pulse type thermal energy. The heating means is associated with the VOC front-end sensing unit 110, and may apply the pulse type thermal energy to the heating carrier 300 when the VOC concentration sensed by the VOC front-end sensing unit 110 is sensed as the predetermined value or higher.

The adsorption/desorption module 100 is a device for instantaneously adsorbing the VOC in the gas introduced into the inlet to prevent the VOC from being discharged.

Further, the concentration of the VOC adsorbed by the adsorption/desorption module 100 may be measured by the VOC front-end sensing unit 110 disposed on one side of the adsorption/desorption module 100.

When the VOC front-end sensing unit 110 disposed on one side of the adsorption/desorption module 100 senses that the concentration of the VOC is highly concentrated (predetermined value) to a constant concentration or higher, the adsorption/desorption module 100 may desorb the VOC.

The VOC front-end sensing unit 110 disposed on one side of the adsorption/desorption module 100 may sense the VOC adsorbed in the adsorption/desorption module 100 and may be associated with the heating carrier 300 and the heating means supplying the pulse type thermal energy to be described below.

The VOC front-end sensing unit 110 may be a nano hybrid polymer material and the material is not limited thereto so long as being a material which is useful for measuring the VOC concentration adsorbed by the adsorption/desorption module 100 and may withstand the heat.

The VOC front-end sensing unit 110 and the VOC rear-end sensing unit 310 may measure the concentration of VOC adsorbed in the VOC adsorption/desorption module 100 or VOC in the air to be discharged to the outside, and are not limited thereto so long as the device can withstand hot heat.

The adsorption/desorption module 100 may continuously adsorb the VOC at 0° C. to 50° C., and may desorb the VOC when the concentration of VOC is a predetermined value or higher.

Further, when the VOC adsorbed by the adsorption/desorption module 100 is high-concentrated (predetermined value or higher) to be desorbed, the thermoelectric energy is applied to the catalyst 200 to activate the catalyst 200 at the same time.

At this time, the VOC desorbed by the adsorption/desorption module 100 may be oxidized by the activated catalyst 200.

Accordingly, the VOC adsorbed continuously in the adsorption/desorption module 100 is adsorbed by the adsorption/desorption module 100 at 0° C. to 50° C. When the VOC concentration is high-concentrated to a predetermined value or higher, the VOC may be desorbed to be removed by the catalyst 200.

The adsorption/desorption module 100 may include an adsorbent, and at this time, the adsorbent may be activated carbon, activated carbon fiber, and zeolite, preferably zeolite.

It is preferable that the adsorbent has a material having a high specific surface area of a porous structure.

An activated carbon filter, an activated carbon fiber filter, and zeolite as the adsorbent may be used alone, and one or more absorbents are combined and used to increase the adsorption efficiency.

The catalyst 200 may be a non-platinum metal catalyst.

Further, the catalyst 200 oxidizes the VOC desorbed by the adsorption/desorption module 100 to convert the VOC to $CO_2$ and $H_2O$.

The catalyst 200 may be used in the form of a bulk by introducing at least one of $Al_2O_3$, $SiO_2$, and $TiO_2$ to the carrier by using metal oxides such as Pt, Pt, Pd, Rh, Cu, Cr, Mn, Fe, Ni, Co, V, and Zn alone or in combination and compressing the carrier by a presser.

On the other hand, the catalyst 200 may be used in the form of monolith catalyst by introducing metal and metal oxides such as Pt, Pt, Pd, Rh, Cu, Cr, Mn, Fe, Ni, Co, V, and Zn alone or in combination to a carrier such as $Al_2O_3$, $SiO_2$, and $TiO_2$ and coating the metal and metal oxides on a honeycomb substrate.

The carrier may be at least one selected from the group consisting of $Al_2O_3$, $SiO_2$, and $TiO_2$, but preferably $Al_2O_3$.

Aluminum oxide is amphoteric oxide that satisfies Chemical Formula of $Al_2O_3$, and generated by separating bauxite.

$SiO_2$ is a representative glass forming mineral, and is easily changed to a glass state when a liquid is quenched to become quartz glass. The quartz glass has very small thermal expansivity ($5\times10^{-7}/°$ C.) due to high heat resistance, and is strong to heat shock and excellent in chemical resistance.

$TiO_2$ is also called titanium dioxide or titanium dioxide. $TiO_2$ is a molecule of binding a titanium atom as transition metal and two oxygen atoms, has the molecular weight of 79.866 g/mol, and is flavorless, odorless white flour. When titanium is exposed in air, titanium easily reacts with oxygen to for a titanium dioxide film.

In order to further improve the oxidization performance of low-temperature VOC of the catalyst according to an embodiment of the present invention, $CeO_2$ and $ZrO_2$ may be used in combination.

The catalyst 200 may be prepared by mixing $CeO_2$ and $ZrO_2$ at a weight ratio of 1:1 to 5.

According to an embodiment of the present invention, the heating carrier 300 is disposed on one side of the catalyst 200 to supply the thermal energy to the catalyst 200, and may further include the VOC rear-end sensing unit 310 which is disposed behind the heating carrier 300 to sense the concentration of VOC converted by the catalyst 200.

Further, the heating carrier 200 further includes a heating means supplying pulse type thermal energy. The heating means is associated with the VOC front-end sensing unit 110, and may apply the pulse type thermal energy to the heating carrier 300 when the VOC concentration sensed by the VOC front-end sensing unit 110 is sensed as the predetermined value or higher.

The heating of the heating carrier 300 may be performed by applying the pulse type energy, preferably, a microwave type.

The heating means is associated with the VOC front-end sensing unit 110 in an electric signal to transmit a signal to the heating means when the high-concentration VOC is adsorbed by the adsorption/desorption module 100, thereby applying the pulse type energy to the heating carrier 300.

The VOC front-end sensing unit 110 may directly measure the concentration value of the VOC adsorbed in the adsorbent, or measure a ratio of the surface area of the adsorption/desorption module 100 and the adsorbed VOC to measure the concentration value by the ratio, but the measurement method is not limited to only the configuration described above.

FIG. 2 illustrates a schematic diagram of a VOC reduction system according to another embodiment of the present invention.

A VOC reduction system 1 according to another preferred embodiment of the present invention includes a housing 10 having an inlet and an outlet formed so that gas is introduced and discharged therethrough; and a composite module 400 including a heating carrier (not illustrated) which is disposed in the housing and has an adsorbent layer capable of adsorbing and concentrating VOC included in the gas and a heating means heating the VOC adsorbed in the adsorbent layer to be desorbed, and a catalyst layer removing the VOC when the VOC is desorbed from the adsorbent. The composite module 400 desorbs the VOC and activates the catalyst layer (not illustrated) when the concentration of VOC adsorbed in the adsorbent layer (not illustrated) is a predetermined value or higher, to remove the VOC.

As long as the housing 10 is made of any material that can withstand hot heat, a type thereof is not limited.

The composite module 400 may include an adsorbent layer, a heating carrier having a heating means, and a catalyst layer.

The heating carrier having the heating means supplies the pulse type thermal energy to the adsorbent layer and the catalyst layer, so that the VOC adsorbed in the adsorbed layer are desorbed by the heating carrier and the catalyst is activated to remove the VOC.

The composite module 400 may further include a concentration measurement sensor 410.

The concentration measurement sensor 410 is associated with the composite module 400 to measure the concentration of VOC adsorbed in the adsorbed layer, and by the sensor 410, the heating carrier may apply the pulse type thermal energy to the adsorbent layer and the catalyst.

When the concentration of the adsorbed VOC measured by the sensor 410 is sensed as a predetermined value or higher, the heating carrier may apply the pulse type energy to the adsorbent layer and the catalyst layer using an electrical signal.

The adsorbent layer may instantly adsorb the VOC in the gas introduced into the inlet to prevent the VOC from being discharged.

In addition, in the adsorbent layer, the concentration of volatile organic compounds (VOC) adsorbed in the adsorbent layer may be measured by the sensor 410, which is further included in the composite module 400.

The sensor 410, which is further included in the composite module 400, may desorb the VOC adsorbed in the adsorbent layer when the concentration of VOC is high-concentrated (predetermined value) to a predetermined concentration or higher.

The sensor 410 further included in the composite module 400 may detect volatile organic compounds (VOC) adsorbed in the adsorbent layer, and transmit an electric signal to the heating carrier having the heating means to apply the pulse type thermal energy to the adsorbent layer and the catalyst layer.

The sensor 410 may be a nano hybrid polymer material, and the kind thereof is not limited thereto so long as being a material which is useful for measuring the VOC concentration adsorbed by the adsorbent layer and may withstand heat.

The sensor 410 may measure the concentration of volatile organic compounds (VOC) adsorbed in the VOC adsorbent layer and is not limited so long as being a device the may withstand hot heat.

The adsorbent may continuously adsorb the VOC at 0° C. to 50° C., and may desorb the VOC when the concentration of VOC is a predetermined value or higher.

The predetermined value may be set arbitrarily by the sensor 410.

Further, when the VOC adsorbed in the adsorbed layer is high-concentrated (predetermined value or higher) and desorbed, thermoelectric energy is applied to the catalyst layer to activate the catalyst at the same time.

At this time, the VOC desorbed from the adsorbent layer may be oxidized by the activated catalyst layer.

Accordingly, the VOC adsorbed continuously in the adsorbent layer is adsorbed by the adsorption/desorption module 100 at 0° C. to 50° C. When the VOC concentration is high-concentrated to a predetermined value or higher, the VOC may be desorbed to be removed by the catalyst layer.

The kind of the adsorbent is not limited, but may be preferably activated carbon, activated carbon fiber, and zeolite, and more preferably zeolite.

It is preferable that the adsorbent has a material having a high specific surface area of a porous structure.

An activated carbon filter, an activated carbon fiber filter, and zeolite as the adsorbent may be used alone, and one or more absorbents are combined and used to increase the adsorption efficiency.

The catalyst of the catalyst layer may be a non-platinum metal catalyst.

The catalyst may be used in the form of a bulk by introducing at least one of $Al_2O_3$, $SiO_2$, and $TiO_2$ to the carrier by using metal oxides such as PT, PT, PD, RH, Cu, CR, MN, Fe, Ni, CO, V, and Zn alone or in combination and compressing the carrier by a presser.

On the other hand, the catalyst may be used in the form of monolith catalyst by introducing metal and metal oxides such as Pt, Pt, Pd, Rh, Cu, Cr, Mn, Fe, Ni, Co, V, and Zn alone or in combination to a carrier such as $Al_2O_3$, $SiO_2$, and $TiO_2$ and coating the metal and metal oxides on a honeycomb substrate.

The carrier may be at least one selected from the group consisting of $Al_2O_3$, $SiO_2$, and $TiO_2$, but preferably $Al_2O_3$.

Aluminum oxide is amphoteric oxide that satisfies Chemical Formula of $Al_2O_3$, and generated by separating bauxite.

$SiO_2$ is a representative glass forming mineral, and is easily changed to a glass state when a liquid is quenched to become quartz glass. The quartz glass has very small thermal expansivity ($5 \times 10^{-7}$/° C.) due to high heat resistance, and is strong to heat shock and excellent in chemical resistance.

$TiO_2$ is also called titanium dioxide or titanium dioxide. $TiO_2$ is a molecule of binding a titanium atom as transition metal and two oxygen atoms, has the molecular weight of 79.866 g/mol, and is flavorless, odorless white flour. When titanium is exposed in air, titanium easily reacts with oxygen to for a titanium dioxide film.

In order to further improve the oxidization performance of low-temperature VOC of the catalyst according to an embodiment of the present invention, $CeO_2$ and $ZrO_2$ may be used in combination.

The catalyst may be prepared by mixing $CeO_2$ and $ZrO_2$ at a weight ratio of 1:1 to 5.

In order to further improve the oxidization performance of low-temperature VOC of the catalyst of the catalyst layer according to an embodiment of the present invention, $CeO_2$ and $ZrO_2$ may be used in combination.

The catalyst may be prepared by mixing $CeO_2$ and $ZrO_2$ at a weight ratio of 1:1 to 5.

The heating carrier having the heating means may supply thermal energy to the catalyst.

In addition, the heating means of the heating carrier supplies pulse type heat energy and is associated with the sensor to apply the pulse type thermal energy to the heating carrier when the concentration of the VOC sensed by the sensor is sensed as a predetermined value or higher.

The heating of the heating carrier may be performed by applying the pulse type energy, preferably, a microwave type.

The sensor 410 may directly measure a concentration value of the VOC adsorbed in the adsorbent or may measure a ratio of the surface area of the adsorbent layer and the adsorbed VOC to measure the concentration value by the ratio.

FIG. 3 is a graph showing catalyst activities of the present invention and a conventional VOC removal system.

As can be seen in FIG. 3, since the pulse type thermal energy is supplied, there is an advantage that the lifetime of the catalyst may be extended and since the thermal energy is supplied only if necessary without heating at all times, there is an advantage that the energy consumption is small.

In a VOC reduction method according to yet another embodiment of the present invention, an adsorption/desorption module adsorbs volatile organic compounds (VOC) in gas, activates a catalyst by applying pulse type thermal energy to a heating carrier when a VOC concentration value of the adsorption/desorption module adsorbed with the VOC is a predetermined value or higher, desorbs the VOC from the adsorption/desorption module adsorbed with the VOC, and then removes the VOC by the activated catalyst.

Further, the pulse type heat energy may be applied to the heating carrier.

The adsorption/desorption module may desorb the VOC when the concentration of the adsorbed VOC is a predetermined value or higher.

Further, by using the VOC reduction system according to the present invention, since the VOC adsorbed in the adsorbent is desorbed by applying the pulse type thermal energy and the catalyst is activated to remove the VOC, there is an advantage capable of saving more energy than a conventional system of supplying energy continuously to activate the catalyst.

When the VOC adsorbed at room temperature reaches a saturation state, the VOC is desorbed by pulse heating and the desorbed VOC is removed from the heated (activated) catalyst at the same time.

In addition, since the pulse type thermal energy is supplied, there is an advantage that the lifetime of the catalyst may be extended and since the thermal energy is supplied only if necessary without heating at all times, there is an advantage that the energy consumption is small.

System for Reducing Nitrogen Oxides

FIG. 4 is a schematic diagram of a pulse control system for reducing nitrogen oxides according to an embodiment of the present invention, FIG. 5 is a graph showing nitrogen oxide conversion performance by time according to injection of heat and a reducing agent in a pulse control system for reducing nitrogen oxides according to an embodiment of the present invention and a conventional denitrification catalyst technology, and FIG. 6 is a diagram showing that a composite catalyst carrier and a heat supplier reduce nitrogen oxides according to an embodiment of the present invention.

Referring to FIG. 4, a pulse control system 2 for reducing nitrogen oxides includes a housing 10, a composite catalyst carrier and a heat supplier 50, a reducing agent supply unit 30, and a pulse signal generator 60.

The housing 10 forms an inlet and an outlet so that exhaust gas is introduced and discharged therethrough, and the composite catalyst carrier and the heat supplier 50 are disposed between the inlet and the outlet and carry an occlusion material for occluding nitrogen oxides (NOx) inside the exhaust gas that has passed through the inlet and an oxidation/reduction catalyst. The reducing agent supply unit 30 stores a reducing agent reducing nitrogen oxides occluded from the occlusion material, and the pulse signal generator 60 is connected with the composite catalyst carrier and the heat supplier 50 and the reducing agent supply unit 30 and generates a pulse signal so that the heat and the concentration of the reducing agent supplied into the housing 10 maintain pulse types over time.

The exhaust gas generated by the combustion of an engine is introduced into the inlet of the housing 10.

The exhaust gas is generated by the engine combustion of an internal combustion engine. The internal combustion engine may be automobiles, ships, industrial machinery, power plants, incinerators, or boilers.

The exhaust gas may include nitrogen oxides, hydrocarbons, carbon monoxides, carbon dioxides, hydrogen, nitrogen, oxygen, sulfur oxides, particle substances, and water.

The nitrogen oxides in the exhaust gas introduced into the inlet are reduced to nitrogen ($N_2$), carbon dioxide ($CO_2$), and water ($H_2O$) through the occlusion-reduction process in the housing 10. At this time, the reduced nitrogen and carbon dioxide are discharged through the outlet of the housing 10.

Examples of nitrogen oxides removed according to the present invention may include nitrogen monoxide, nitrogen dioxide, nitrous trioxide, nitrous tetraoxide, nitrous oxide, and mixtures thereof. Preferably, examples are nitrogen monoxide, nitrogen dioxide, and nitrous oxide. The nitrogen oxide concentration of the discharge gas that may be processed by the present invention is not limited.

The composite catalyst carrier and the heat supplier 50 are located between the inlet and the outlet of the housing 10 and the oxidation/reduction catalyst and the occlusion material are carried on the composite catalyst carrier and the heat supplier 50.

The oxidation catalyst serves to oxidize nitrogen monoxide (NO) to nitrogen dioxide ($NO_2$) and carbon monoxide (CO) and hydrocarbon (HC) to carbon dioxide ($CO_2$) or water ($H_2O$) in a lean mode. The reduction catalyst serves to reduce nitrogen oxides (NOx) to nitrogen ($N_2$).

The oxidation/reduction catalyst may use any one selected from the group consisting of noble metals, transition metals, and combinations thereof.

The noble metals may use any one selected from platinum (Pt), palladium (Pd), rhodium (Rh), iridium (Ir), ruthenium (Ru), gold (Au), silver (AG), or combinations thereof. The transition metals may use any one selected from cobalt (Co), iron (Fe), cerium (Ce), copper (Cu), nickel (Ni), manganese (Mn), vanadium (V), or combinations thereof. Preferably, platinum-based noble metal may be used in the noble metals and manganese, vanadium, cobalt or copper may be used in the transition metals.

The occlusion material serves to occlude the nitrogen oxides oxidized by the oxidation catalyst in the lean mode. The occlusion material capable of occluding nitrogen oxides may use any one selected from the group consisting of alkali metals, alkaline earth metals, transition metals, rare earth metals, and combinations thereof. Further, zeolite such as CHA, BEA, MFI is ion-exchanged to be used as an occlusion material.

Specifically, among alkali metals, any one selected from the group consisting of potassium (K), sodium (Na), cesium (Ce), and lithium (Li) may be used, and among alkaline earth metals, any one selected from the group consisting of barium (Ba), calcium (Ca), strontium (Sr), and magnesium (Mg) may be used. Further, as transition metals, any one selected from the group consisting of palladium (Pd), platinum (Pt), rhodium (Rh), iridium (Ir), silver (Ag), ruthenium (Ru), copper (Cu), vanadium (V), nickel (Ni), cobalt (Co), iron (Fe), and manganese (Mn) may be used.

Referring to FIG. 6, the composite catalyst carrier and the heat supplier 50 serve to support the occlusion material and the oxidation/reduction catalyst. The composite catalyst carrier and the heat supplier 50 of the present invention do not limit a type thereof, and may use any one selected from the group consisting of acidic, basic or neutral zeolites as well as natural or synthetic zeolites, ceria ($CeO_2$), alumina ($Al_2O_3$), titania ($TiO_2$), zirconia ($ZrO_2$) or combinations thereof.

In the present invention, the oxidation/reduction catalyst is carried in a support by a conventional ion exchange method, a deposition method, a precipitation method, an adsorption method, an impregnation method, and the like. The oxidation/reduction catalyst made of powder and the occlusion material may be coated and carried on the composite catalyst carrier and the heat supplier 50. Preferably, the occlusion material and the oxidation/reduction catalyst may be carried on the surface of the composite catalyst carrier and the heat supplier 50 or may be included as a component of the composite catalyst carrier and the heat supplier 50.

The composite catalyst carrier may be self-heated by the heat supplier, or may be heated by external heat. The heat applied to the composite catalyst carrier is maintained and applied in a pulse type by the signal of the pulse signal generator 60 as illustrated in FIG. 5.

The composite catalyst carrier and the heat supplier 50, which carry the occlusion material and the oxidation/reduction catalyst according to an embodiment of the present invention, may be prepared by the following preparation method.

First, the composite catalyst carrier and the heat supplier 50 selected from the group consisting of natural or synthetic zeolites, acidic, basic or neutral zeolites, ceria ($CeO_2$), alumina ($Al_2O_3$), titania ($TiO_2$), zirconia ($ZrO_2$) or combinations thereof are impregnated in a precursor solution of the occlusion material selected from alkali metals, alkaline earth metals or combinations thereof. The composite catalyst carrier and the heat supplier 50 impregnated in the precursor solution of the occlusion material is calcined to form a carrier-occlusion material composite, and then the composite is impregnated in a precursor solution of the oxidation catalyst selected from noble metals, transition metals, or combinations thereof.

In the preparation step, the carrier-occlusion material composite is separately calcined before the fixation of the oxidation catalyst to prevent the activation of an interface between the occlusion material and the oxidation catalyst and the calcining may be performed at 300° C. to 500° C.

The composite catalyst carrier and the heat supplier 50 may further include a binder and/or a dispersant.

The binder may use, for example, alum inazole, sol type metal oxides such as water glass, polyvinyl alcohol (PVA), polyvinylpyrrolidone (PVP), polyurethane (PU), polyetherourethane, polyurethane copolymer, cellulose acetate, cellulose acetate propionate, cellulose acetate butylrate, polymethylsacrylate (PMMA), polymethyl acrylate (PMA), polyacrylic copolymer, polyvinyl acetate (PVAc), polyvinyl acetate copolymer, polyfurfuryl alcohol (PPFA), polystyrene (PS), polystyrene copolymer, polyethylene oxide (PEO), polypropylene oxide (PPO), polyethylene oxide copolymer, polypropylene oxide copolymer, polycarbonate (PC), polyvinyl chloride (PVC), polycaprolactone (PCL), polyvinylidene fluoride (PVDF), polyvinylidene fluoride copolymer, polyamide, etc.

The dispersant may use, for example, polyacrylic acid, polymethacrylic acid, pyrophosphoric acid, citric acid, polymaric acid, ammonium polymethacrylate, benzoic acid, catechol, and pyrogallol, and the like.

The binder functions to improve adhesion so that a coating layer may be adhered well to a substrate and the dispersant may entirely disperse the binder particles well.

A reducing agent for reducing nitrogen oxides is supplied into the housing 10. The reducing agent reduces and desorbs the nitrogen oxides occluded from the occlusion material in the form of nitrogen oxide ($N_2$), carbon dioxide ($CO_2$), and water ($H_2O$).

The reducing agent is supplied into the housing 10 through the reducing agent supply unit 30. The reducing agent supply unit 30 is connected to the pulse signal generator 60, and as a result, the concentration of the reducing agent to be supplied into the housing 10 may maintain the pulse type by a signal of the pulse signal generator 60.

Referring to FIG. 5, the present invention allows the heat and the concentration of the reducing agent to be supplied into the housing 10 to maintain the pulse types by the signal of the pulse signal generator 60 over time.

When the nitrogen oxides are occluded by the occlusion material, the reducing agent supplied by the pulse signal generator 60 reduces the occluded nitrogen oxides to nitrogen, carbon dioxide, and water without changing the concentration of the exhaust gas. After the reduction, while the occlusion material occludes the nitrogen oxides again, the supply of the reducing agent is stopped by a pulse signal of the pulse signal generator 60. While the process is repeated, the concentration of the reducing agent in the housing 10 maintains the pulse type over time. As a result, to reduce nitrogen oxides, excess fuel combustion has not been required, and the nitrogen oxides may be reduced using only a calculated amount of reducing agent.

Therefore, it is possible to reduce the nitrogen oxides in the lean mode without a need to adjust an air to fuel ratio artificially in a rich mode, and it is possible to expect an effect of cost reduction without a need to supply fuel continuously. In addition, unlike urea SCR, there is no need to install additional devices such as a storage tank and a pump for supplying the reducing agent and there is no need for a driver to periodically supplement the reducing agent, so that there is an advantage that the operating is easy.

The reducing agent may utilize fuel itself or modify and use fuel. Alternatively, it is possible to convert and use the reducing agent to a high performance reducing agent through the reaction with the exhaust gas. The exhaust gas capable being used as the reducing agent may use any one selected from the group consisting of hydrogen ($H_2$), carbon monoxide (CO), hydrocarbons (HC), partially-oxidized hydrocarbon (OHC), carbon-nitrogen compounds, hydrogen-nitrogen compounds, self-generated ammonia (NH$_3$), and mixtures thereof, preferably carbon monoxide.

Energy for producing the reducing agent may use exhaust heat or power. The produced reducing agent is stored in the reducing agent supply unit 30, and may be supplied into the housing 10 by directly operating valves or supplied to the composite catalyst carrier and the heat supplier 50 through switching by using a power-based supply technique.

The pulse signal generator 60 is connected to the composite catalyst carrier and the heat supplier 50 and the reducing agent supply unit 30, respectively, to allow the heat and the concentration of the reducing agent to be supplied into the housing 10 to maintain the pulse types over time.

The pulse signal generator 60 is not limited to its type as long as the heat and the concentration of the reducing agent to be supplied into the housing 10 may be maintained in the pulse types. The pulse signal generator 60 may be operated by, for example, gas supply or heat supply.

A conventional SCR technique has a disadvantage in that since a urea solution as the reducing agent needs to be periodically supplemented, the economic burden is large, and since a separate device is required, space utilization is low. In addition, in a conventional LNT technique, nitrogen oxides cannot be selectively removed in a lean mode and a catalyst similar to a three way catalyst in which an active material is carried needs to be used, so that the exhaust gas needs to be adjusted to an air to fuel ratio or less. Therefore, there were problems in that to reduce the occluded nitrogen oxides, the air to fuel ratio is artificially controlled to the rich mode to change the entire composition of the exhaust gas, and the fuel consumption is deteriorated by using excessive fuel as the reducing agent in a process of reducing nitrogen oxides by making a rich atmosphere of fuel.

In order to solve the problems, in the present invention, it is possible to reduce nitrogen oxides by using a selective denitrification catalyst based on the pulse control system capable of reducing nitrogen oxides even in the lean mode unlike the LNT technique and using a reducing agent or fuel-reformed reducing agent in the exhaust gas other than ammonia unlike the SCR technique.

Therefore, it is possible to greatly reduce the cost of entering the reducing agent by overcoming the disadvantages of the conventional SCR technology, which had to continuously supply the reducing agent. In addition, since hydrogen, carbon monoxide, hydrocarbon in the exhaust gas are used as a reducing agent, it is not necessary to input a separate device for supplementing the reducing agent, and as a result, there is a advantage that it is possible to be installed even in old cars, ships, and all other internal combustion engine power systems.

The nitrogen oxides are reduced and desorbed in the form of nitrogen, carbon dioxide, water by the reducing agent, and the nitrogen and the carbon dioxide are discharged through the outlet of the housing 10.

Method for Reducing Nitrogen Oxides Using Pulse Control System

FIG. 7 is a flowchart of a method for reducing nitrogen oxides by a pulse control system according to the present invention.

Referring to FIG. 7, a method for reducing nitrogen oxides using a pulse control system includes (a) introducing exhaust gas through an inlet of a housing; (b) occluding nitrogen oxides in the exhaust gas by an occlusion material and supplying heat to be supplied into the housing by a signal of a pulse signal generator while maintaining a pulse type over time; (c) reducing and desorbing the nitrogen oxides by a reducing agent; and (d) discharging the reduced nitrogen (N$_2$) and carbon dioxide (CO$_2$) through an outlet of the housing.

First, the exhaust gas is introduced through the inlet of the housing (S10).

The exhaust gas is generated by the engine combustion of an internal combustion engine. The internal combustion engine may be automobiles, ships, industrial machinery, power plants, incinerators, or boilers.

The exhaust gas may include nitrogen oxides, hydrocarbons, carbon monoxides, carbon dioxides, hydrogen, nitrogen, oxygen, sulfur oxides, particle substances, and water.

The nitrogen oxides in the exhaust gas introduced into the inlet are reduced to nitrogen (N$_2$), carbon dioxide (CO$_2$), and water (H$_2$O) through the occlusion-reduction process in the housing. The reduced nitrogen and carbon dioxide are discharged through the outlet of the housing.

Examples of nitrogen oxides removed according to the present invention may include nitrogen monoxide, nitrogen dioxide, nitrous trioxide, nitrous tetraoxide, nitrous oxide, and mixtures thereof. Preferably, examples are nitrogen monoxide, nitrogen dioxide, and nitrous oxide. The nitrogen oxide concentration of the discharge gas that may be processed by the present invention is not limited.

The exhaust gas may maintain a space velocity per hour of atmospheric pressure (1 atm) or more and 1,000 h$^{-1}$ to 300,000 h$^{-1}$ in the housing. A preferable space velocity per hour is 3,000 h$^{-1}$ to 100,000 h$^{-1}$, and when the space velocity is less than 1,000 h$^{-1}$, economic losses may occur due to the excess use of the occlusion material and the reducing agent, and when the space velocity is more than 300,000 h$^{-1}$, the pressure loss is increased due to the fluid flow and the device may be mechanically damaged.

Next, the nitrogen oxides in the exhaust gas are occluded by the occlusion material and the heat to be supplied into the housing is supplied by the signal of the pulse signal generator while maintaining the pulse type over time (S20).

The occlusion material serves to occlude the nitrogen oxides in the lean mode. The occlusion may be performed at 150° C. to 700° C.

The occlusion material capable of occluding nitrogen oxides may use any one selected from the group consisting of alkali metals, alkaline earth metals, transition metals, rare earth metals, and combinations thereof. Further, zeolite such as CHA, BEA, MFI is ion-exchanged to be used as an occlusion material.

Specifically, among alkali metals, any one selected from the group consisting of potassium (K), sodium (Na), cesium (Ce), and lithium (Li) may be used, and among alkaline earth metals, any one selected from the group consisting of barium (Ba), calcium (Ca), strontium (Sr), and magnesium (Mg) may be used. Further, as transition metals, any one selected from the group consisting of palladium (Pd), platinum (Pt), rhodium (Rh), iridium (Ir), silver (Ag), ruthenium (Ru), copper (Cu), vanadium (V), nickel (Ni), cobalt (Co), iron (Fe), and manganese (Mn) may be used.

Before the occlusion by the occlusion material, by the oxidation catalyst, nitrogen monoxide (NO) may be oxidized to nitrogen dioxide (NO$_2$), and carbon monoxide (CO) and hydrocarbon (HC) may be oxidized to carbon dioxide (CO$_2$) or water (H$_2$O). Further, by the reduction catalyst, nitrogen oxides (NOx) may be reduced to nitrogen (N$_2$).

Specifically, the oxidation/reduction catalyst may use any one selected from the group consisting of noble metals, transition metals, and combinations thereof.

The precious metals may use any one selected from platinum (Pt), palladium (Pd), rhodium (Rh), iridium (Ir), ruthenium (Ru), gold (Au), silver (AG), or combinations thereof. The transition metals may use any one selected from cobalt (Co), iron (Fe), cerium (Ce), copper (Cu), nickel (Ni), manganese (Mn), vanadium (V), or combinations thereof. Preferably, platinum-based noble metal may be used in the noble metals and manganese, vanadium, cobalt or copper may be used in the transition metals.

The occlusion material and the oxidation/reduction catalyst are carried in the composite catalyst carrier. The composite catalyst carrier is not limited to a type thereof, and may use any one selected from the group consisting of acidic, basic or neutral zeolites as well as natural or synthetic zeolites, ceria ($CeO_2$), alumina ($Al_2O_3$), titania ($TiO_2$), zirconia ($ZrO_2$) or combinations thereof.

The composite catalyst carrier may be self-heated by the heat supplier, or may be heated by external heat. The heat applied to the composite catalyst carrier may be applied while maintaining the pulse type by the signal of the pulse signal generator.

The pulse signal generator is not limited to its type as long as the concentration of the reducing agent and the heat to be supplied into the housing may be maintained in the pulse types. In addition, the pulse signal generator may be operated, for example, by gas supply or heat supply.

The nitrogen oxides are reduced and desorbed by the reducing agent while the heat is supplied (S30).

The reducing agent may utilize fuel itself or use a reducing agent converted to a high performance reducing agent through the reforming of fuel or the reaction with exhaust gas. The reducing agent may use any one selected from the group consisting of hydrogen ($H_2$), carbon monoxide (CO), hydrocarbon (HC), partially-oxidized hydrocarbon (OHC), carbon-nitrogen compounds, hydrogen-nitrogen compounds, self-generated ammonia ($NH_3$), and mixtures thereof included in the exhaust gas, preferably carbon monoxide.

The reduction may be performed at 100° C. to 750° C.

The reducing agent is supplied into the housing through the reducing agent supply unit. The reducing agent supply unit is connected to the pulse signal generator, and as a result, the concentration of the reducing agent to be supplied into the housing may maintain the pulse type by the signal of the pulse signal generator.

Specifically, after the nitrogen oxides are occluded by the occlusion material, the reducing agent supplied by the pulse signal generator reduces the occluded nitrogen oxides to nitrogen, carbon dioxide, and water without changing the concentration of the exhaust gas. After the reduction, while the occlusion material occludes the nitrogen oxides again, the supply of the reducing agent is stopped by a pulse signal of the pulse signal generator. While the process is repeated, the concentration of the reducing agent therein maintains the pulse type over time.

A conventional SCR technique had a disadvantage in that since a urea solution as the reducing agent needs to be periodically supplemented, the economic burden is large, and since a separate device is required, space utilization is low. According to the present invention, after the nitrogen oxides are occluded by the occlusion material, the reducing agent is supplied by the signal of the pulse signal generator to reduce the occluded nitrogen oxides to nitrogen, carbon dioxide, and water. After the reduction, while the occlusion material occludes the nitrogen oxides again, the supply of the reducing agent is stopped.

In addition, in a conventional LNT technique, nitrogen oxides cannot be selectively removed in a lean mode and a catalyst similar to a three way catalyst in which an active material is carried needs to be used, so that the exhaust gas needs to be adjusted to an air to fuel ratio or less. Therefore, there were problems in that to reduce the occluded nitrogen oxides, the air to fuel ratio is artificially controlled to the rich mode to change the entire composition of the exhaust gas, and the fuel consumption is deteriorated by using excessive fuel as the reducing agent in a process of reducing nitrogen oxides by making a rich atmosphere of fuel.

In order to solve these problems, according to the present invention, it is possible to reduce nitrogen oxides by using a selective denitrification catalyst capable of reducing nitrogen oxides even in the lean mode of fuel unlike the LNT technique and using a reducing agent or fuel-reformed reducing agent in the exhaust gas without using ammonia unlike the SCR technique.

Therefore, it is possible to reduce the nitrogen oxides in the lean mode without a need to adjust an air to fuel ratio artificially to a rich mode, and it is possible to expect an effect of cost reduction without a need to supply fuel continuously. In addition, unlike urea SCR, since there is no need to install additional devices such as a storage tank and a pump for supplying the reducing agent, it is possible to be applied to old cars, ships, and all other internal combustion power systems, and since there is no need for a driver to periodically supplement the reducing agent, there is an advantage that the operating is easy.

The energy for the production of the reducing agent may use exhaust heat or power supplied into the pulse control system. The produced reducing agent is stored in the reducing agent supply unit and may be supplied to the composite catalyst carrier and the heat supplier through switching by directly operating valves or using a power-based supply technique.

Finally, the nitrogen oxides are reduced and desorbed in the form of nitrogen ($N_2$), carbon dioxide ($CO_2$), and water ($H_2O$) by the reducing agent and the nitrogen and the carbon dioxide are discharged through the outlet of the housing (S50).

TABLE 1

| Desorption area (a.u) | Adsorption area (a.u) | Desorption area/ adsorption area | NOx reduction rate (%) |
|---|---|---|---|
| 4017 | 8762 | 0.458 | 54% |

Table 1 is a table showing a reduction rate of nitrogen oxides reduced through the composite catalyst carrier of the pulse control system according to an embodiment of the present invention. Referring to Table 1, in the pulse control system of the present invention, the reduction rate of nitrogen oxides reduced through the composite catalyst carrier is about 54% and it may be expected to reduce 90% or more of nitrogen oxides through the use of appropriate occlusion material and catalyst, a parallel system, etc.

Internal Combustion Engine Including Pulse Control System

An internal combustion engine according to an embodiment of the present invention includes a pulse control system for reducing nitrogen oxides.

The internal combustion engine may further include a fuel tank for storing fuel, an engine generating kinetic energy by combusting the fuel, a combustion chamber of the engine, and an exhaust pipe.

The exhaust gas is generated by the engine combustion of an internal combustion engine. The internal combustion engine may be automobiles, ships, industrial machinery, power plants, incinerators, or boilers.

The engine converts chemical energy into mechanical energy by combusting mixed gas in which fuel and air are mixed.

The combustion chamber includes an intake port for introducing air and an exhaust port for discharging exhaust gas, and an injector for injecting the fuel may be formed at an upper central portion of the combustion chamber.

The intake port of the combustion chamber is connected with the engine to introduce the air into the combustion chamber, and the exhaust port of the combustion chamber is connected with the engine to collect the exhaust gas generated in the combustion process in the exhaust port and then discharge the collected exhaust gas to the outside of a vehicle.

The exhaust pipe is connected to the exhaust port to discharge the exhaust gas generated in the engine.

At this time, the pulse control system is formed in the exhaust pipe to remove the nitrogen oxides included in the exhaust gas.

The housing of the pulse control system is formed with an inlet through which the exhaust gas is introduced and an outlet through which reduced nitrogen and carbon dioxide are discharged.

The pulse control system comprises a carrier in which an oxidation catalyst and an occlusion material are carried. The occlusion material may occlude nitrogen oxides (NOx) in the exhaust gas passing through the inlet, and the oxidation catalyst may oxidize nitrogen monoxide to nitrogen dioxide.

Fuel for reducing nitrogen oxides in the housing is supplied, and the concentration of the fuel to be supplied maintains the pulse type over time by the signal of the pulse signal generator.

The pulse signal generator is not limited to its type as long as the concentration of the fuel to be supplied into the housing may be maintained in the pulse type.

According to the present invention, it is possible to reduce nitrogen oxides in a lean mode without artificially adjusting an air to fuel ratio to a rich mode so that the concentration of the fuel to be supplied into the housing may maintain the pulse type over time and to expect a cost reduction effect without a need to supply continuously the fuel.

The concentration of the reducing agent may also maintain the pulse type over time by the signal of the pulse signal generator.

When the concentration of the reducing agent is adjusted to the pulse type by the pulse signal generator, there is a cost reduction effect without a need to supply continuously the reducing agent and it is possible to be installed even in small vehicles without a need to input a separate device by supplementing the reducing agent.

The nitrogen oxides are reduced and desorbed in the form of nitrogen, carbon dioxide, and water by the reducing agent, and the nitrogen and the carbon dioxide are discharged through the outlet of the housing.

As described above, the system of reducing the VOC and nitrogen oxides and the method for reducing the same according to an embodiment of the present invention have been described, but it will be apparent that various modification can be made within the range without departing from the scope of the present invention.

Therefore, the scope of the present invention should not be limited to the embodiments and should be defined by the appended claims and equivalents to the appended claims.

In other words, the embodiments described above are illustrative in all aspects and should be understood as not being restrictive, and the scope of the present invention is represented by appended claims to be described below rather than the detailed description, and it is to be interpreted that the meaning and scope of the appended claims and all changed or modified forms derived from the equivalents thereof are included within the scope of the present invention.

The invention claimed is:

1. A pulse control system for reducing nitrogen oxides comprising:
   a housing having an inlet and an outlet formed such that exhaust gas is introduced and discharged therethrough;
   a composite catalyst carrier and heat supplier including a composite catalyst carrier and a heat supplier which are disposed between the inlet and the outlet and carry an occlusion material for occluding nitrogen oxides (NOx) inside the exhaust gas that has passed through the inlet and an oxidation/reduction catalyst;
   a reducing agent supply unit for storing a reducing agent for reducing the nitrogen oxides occluded by the occlusion material; and
   a pulse signal generator which is connected to each of the composite catalyst carrier and heat supplier, and the reducing agent supply unit to generate pulse signals so that the heat supplied into the composite catalyst carrier and the concentrations of reducing agent supplied into the housing maintain pulse types over time,
   wherein the composite catalyst carrier is directly heated by the heat supplier disposed on one side of the carrier.

2. The pulse control system for reducing nitrogen oxides of claim 1, wherein the occlusion material is any one selected from the group consisting of alkali metals, alkaline earth metals, transition metals, rare earth metals, zeolite and combinations thereof.

3. The pulse control system for reducing nitrogen oxides of claim 1, wherein the oxidation/reduction catalyst is any one selected from the group consisting of noble metals, transition metals, and combinations thereof.

4. The pulse control system for reducing nitrogen oxides of claim 1, wherein the occlusion material and the oxidation/reduction catalyst are carried on the surface of the carrier, or included as a component of the carrier.

5. The pulse control system for reducing nitrogen oxides of claim 1, wherein the reducing agent is any one selected from the group consisting of hydrogen ($H_2$), carbon monoxide (CO), hydrocarbon (HC), partially-oxidized hydrocarbon (OHC), carbon-nitrogen compounds, hydrogen-nitrogen compounds, ammonia ($NH_3$), and mixtures thereof.

6. An internal combustion engine including the pulse control system of claim 1.

7. A method for reducing nitrogen oxides using a pulse control system, the method comprising:
   (a) introducing exhaust gas through an inlet of a housing;
   (b) occluding nitrogen oxides in the exhaust gas by an occlusion material in a composite catalyst carrier and supplying heat to be supplied into the composite catalyst carrier by a signal of a pulse signal generator while maintaining a pulse type over time;
   (c) reducing and desorbing the nitrogen oxides by a reducing agent; and
   (d) discharging the reduced nitrogen ($N_2$) generated in the step (c) through an outlet of the housing,
   wherein the composite catalyst carrier is directly heated by a heat supplier disposed on one side of the carrier,
   wherein the concentration of the reducing agent in step (c) maintains a pulse type over time by a signal of the pulse signal generator.

8. The method of claim 7, wherein before the occlusion in step (b), nitrogen monoxide (NO) is oxidized to nitrogen dioxide ($NO_2$) by an oxidation catalyst.

9. The method of claim 7, wherein the occlusion material in step (b) is any one selected from the group consisting of alkali metals, alkaline earth metals, transition metals, rare earth metals, zeolite and combinations thereof.

10. The method of claim 7, wherein the reducing agent in step (c) is any one selected from the group consisting of hydrogen ($H_2$), carbon monoxide (CO), hydrocarbon (HC), partially-oxidized hydrocarbon (OHC), carbon-nitrogen compounds, hydrogen-nitrogen compounds, ammonia ($NH_3$), and mixtures thereof.

* * * * *